United States Patent
Lee et al.

(10) Patent No.: US 8,540,283 B2
(45) Date of Patent: Sep. 24, 2013

(54) APPARATUS FOR MOUNTING SEAT BELT TO VEHICLE BODY

(75) Inventors: Ji Yeoun Lee, Hwaseong-si (KR); Choong Sik Shin, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 90 days.

(21) Appl. No.: 13/165,176

(22) Filed: Jun. 21, 2011

(65) Prior Publication Data

US 2012/0139222 A1    Jun. 7, 2012

(30) Foreign Application Priority Data

Dec. 3, 2010   (KR) ........................ 10-2010-0122662

(51) Int. Cl.
*B60R 22/22*   (2006.01)
*B60R 22/24*   (2006.01)
*B60R 22/195*  (2006.01)

(52) U.S. Cl.
USPC .................... 280/808; 280/801.1; 280/806

(58) Field of Classification Search
USPC ........... 280/801.1, 808, 801.2, 806; 297/480, 297/485
IPC ................................ B60R 22/195, 22/22, 22/24
See application file for complete search history.

(56) References Cited

U.S. PATENT DOCUMENTS

| | | | | |
|---|---|---|---|---|
| 4,767,161 A * | 8/1988 | Sedlmayr et al. | ............. | 297/472 |
| 4,915,414 A * | 4/1990 | Weman | ...................... | 280/801.1 |
| 6,382,674 B1 * | 5/2002 | Specht et al. | ................. | 280/806 |
| 6,527,299 B2 * | 3/2003 | Specht et al. | ................. | 280/806 |
| 6,565,121 B2 * | 5/2003 | Knych et al. | .................. | 280/806 |
| 7,273,232 B2 * | 9/2007 | Fontecchio et al. | ........... | 280/808 |
| 7,364,201 B2 * | 4/2008 | Lutz et al. | ..................... | 280/806 |
| 2011/0291395 A1 * | 12/2011 | Moeker et al. | ................ | 280/806 |

FOREIGN PATENT DOCUMENTS

| | | | |
|---|---|---|---|
| JP | 2007-238030 A | * | 9/2007 |
| KR | 1998-051135 U | | 10/1998 |
| KR | 1998-072640 A | | 11/1998 |
| KR | 10-2010-0026437 A | | 3/2010 |

* cited by examiner

*Primary Examiner* — Ruth Ilan

(74) *Attorney, Agent, or Firm* — Morgan, Lewis & Bockius LLP

(57) ABSTRACT

An apparatus for mounting a seat belt to a vehicle body, may include a wire integrally having on a first end thereof a belt insert ring, an end of the seat belt being inserted into the belt insert ring, a wire installing unit coupled to a second end of the wire and secured to the vehicle body, and a belt restraining unit coupled to the vehicle body while slidably receiving the seat belt so as to restrain movement of the seat belt which may be inserted into the belt insert ring.

13 Claims, 6 Drawing Sheets

APPARATUS FOR MOUNTING SEAT BELT TO VEHICLE BODY

CROSS-REFERENCE TO RELATED APPLICATIONS

The present application claims priority to Korean Patent Application No. 10-2010-0122662 filed on Dec. 3, 2010, the entire contents of which is incorporated herein for purposes by this reference.

BACKGROUND OF THE INVENTION

1. Field of the Invention

The present invention relates generally to an apparatus for mounting a seat belt to a vehicle body and, more particularly, to an apparatus for mounting a seat belt to a vehicle body, which is intended to minimize the amount of interior space occupied and realize reductions in weight and cost.

2. Description of Related Art

Generally, a seat of a vehicle is equipped with a seat belt which restrains the upper body of an occupant sitting in the seat so as to protect the occupant, in the event of a collision or a rear-end collision.

As shown in FIGS. 1 and 2, a first end of the seat belt 1 passes through a belt guide ring 2, is inserted through the upper end of a center pillar trim 3 into the center pillar trim 3, and then is wound around a pretensioner (not shown), while a second end is coupled to an apparatus 10 for mounting the seat belt to a vehicle body, which protrudes from the lower end of the center pillar trim 3 to the interior of the vehicle.

Further, a belt tongue 4 is provided on the seat belt 1 in such a way as to be movable in the longitudinal direction of the seat belt 1. The belt tongue 4 is detachably coupled to a buckle 6 which is provided on a side of a seat 5.

Here, the apparatus 10 includes a mini tongue 11 into which the second end of the seat belt 1 is fitted, a wire 12 which is coupled at a first end thereof to the mini tongue 11, a wire installing unit 13 which is coupled to a second end of the wire 12 and is secured to a floor panel (not shown), and a cover member 14 which covers both the mini tongue 11 and the wire 12 to protect them.

However, the conventional apparatus 10 is problematic in that all components (the mini tongue, the wire, and the cover member) except for the wire installing unit 13 take up the interior space when installed, so that the appearance of the interior is poor. Further, the conventional apparatus 10 is problematic in that it is severely shaken by the inertia of a driving vehicle, so that it may collide with a vehicle body, thus causing noise. The apparatus 10 interferes with the feet of a passenger who is sitting in a rear seat, thus reducing the riding comfort for the passenger sitting in the rear seat. Especially, the apparatus 10 hinders the correct deployment of an airbag tube when a side airbag is deployed.

Further, the conventional apparatus 10 is problematic in that it includes the mini tongue 11 and the cover member 14, so that its volume and weight are large and a manufacturing cost is high.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for mounting a seat belt to a vehicle body, which improves the appearance of the interior of a vehicle, prevents noise from being generated by eliminating interference between the apparatus and the vehicle body, improves riding comfort by permitting the feet of a passenger who is sitting in a rear seat to be comfortably placed, enables an airbag tube to be correctly deployed by eliminating interference between the apparatus and the airbag tube when a side airbag is deployed, and realizes reductions in volume, weight, and cost.

In an aspect of the present invention, the apparatus for mounting a seat belt to a vehicle body, may include a wire integrally having on a first end thereof a belt insert ring, an end of the seat belt being inserted into the belt insert ring, a wire installing unit coupled to a second end of the wire and secured to the vehicle body, and a belt restraining unit coupled to the vehicle body while slidably receiving the seat belt so as to restrain movement of the seat belt which may be inserted into the belt insert ring.

The wire installing unit may be secured to a floor panel placed in an interior of a vehicle, wherein the wire may be aligned along the floor panel, and wherein the wire may be operable between the wire installing unit and the belt restraining unit.

The belt restraining unit may include a pair of rotary hooks, each of the rotary hooks having a U-shaped hook part that slidably receives the seat belt, and being rotatably coupled at a first end thereof to the vehicle body, wherein one of the rotary hooks may be rotatably provided on a floor panel placed in an interior of a vehicle, and a remaining one of the rotary hooks may be rotatably provided on a side member, and wherein the rotary hook provided on the floor panel which may be placed in the interior of the vehicle may be covered with a carpet.

The belt restraining unit may include a rotary hook having a U-shaped hook part that slidably receives the seat belt, and rotatably coupled at a first end thereof to the vehicle body, a hook mounting bracket having one hook insert part and secured to the vehicle body, and a looped hook inserted into the hook insert part to be rotatable relative to the hook mounting bracket, the seat belt passing through a space between the looped hook and the hook mounting bracket, wherein the rotary hook may be rotatably provided on a floor panel placed in an interior of a vehicle, and the hook mounting bracket may be rotatably provided on a side member, and wherein the rotary hook provided on the floor panel which may be placed in the interior of the vehicle may be covered with a carpet.

The belt restraining unit may include a hook mounting bracket having on opposite ends thereof two hook insert parts, the hook mounting bracket being secured to the vehicle body, and two U-shaped rotary hooks, each of the rotary hooks being rotatably inserted at a first end thereof into the corresponding hook insert part, the seat belt passing through space between the rotary hooks and the hook insert parts, wherein the hook mounting bracket may be secured to a side member.

The belt restraining unit may include a hook mounting bracket having one hook insert part and secured to the vehicle body, and a double hook having a rod part which rotatably passes through the hook insert part, and a pair of hook parts which may be bent, respectively, on opposite ends of the rod part in a U shape, wherein the seat belt may be slidably received under the hook parts, wherein the hook mounting bracket may be secured to a side member.

As is apparent from the above description, an apparatus for mounting a seat belt to a vehicle body according to the present invention is advantageous in that it is constructed so that only a seat belt and a belt restraining unit are exposed to the interior of a vehicle, thus remarkably improving the appearance of the interior, and no component collides with the vehicle body even if the seat belt is shaken by the inertia of the driving vehicle, thus considerably improving the sound level of the interior, and it allows the feet of a passenger sitting in a rear seat to be comfortably placed, thus remarkably improving the riding comfort for the passenger sitting in the rear seat, and there is no interference between the apparatus and an airbag tube especially when a side airbag is deployed, so that the airbag tube can be guided to be correctly deployed, and it realizes reductions in volume, weight and cost.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
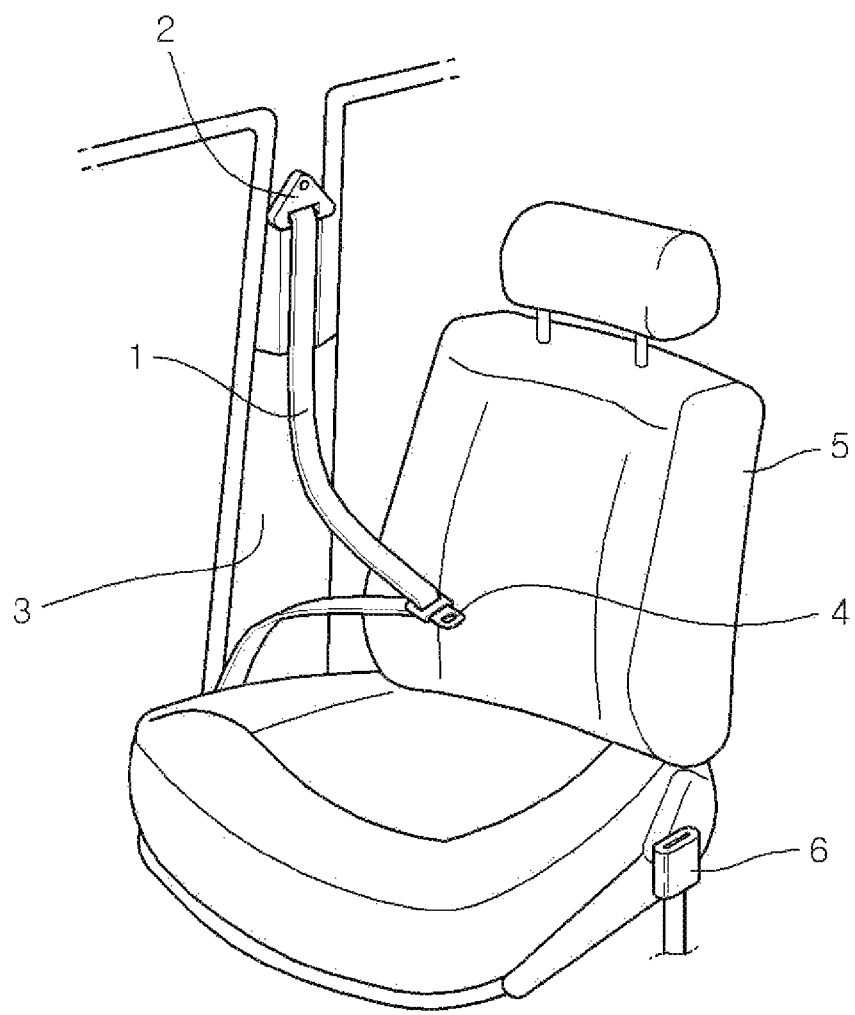
FIG. 1 is a perspective view showing the interior of a vehicle equipped with a seat belt.
Figure 2:
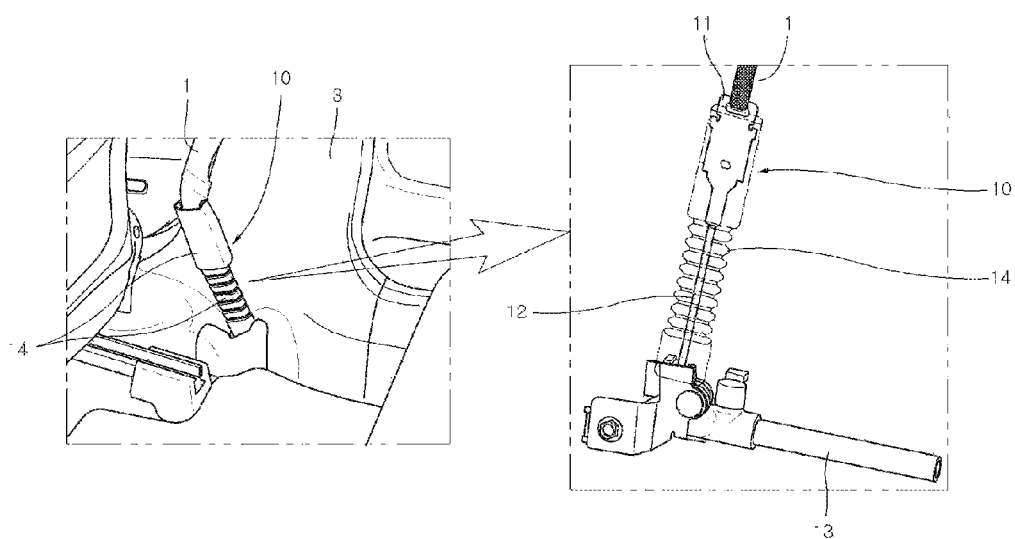
FIG. 2 is a view illustrating a conventional apparatus for mounting a seat belt to a vehicle body.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Referring to FIG. 1, a first end of a seat belt 1 which is provided in a vehicle passes through a belt guide ring 2, is inserted through the upper end of a center pillar trim 3 into the center pillar trim 3, and then is wound around a pretensioner, while a second end is coupled to an apparatus for mounting a seat belt to a vehicle body according to an exemplary embodiment of the present invention.

Figure 3:
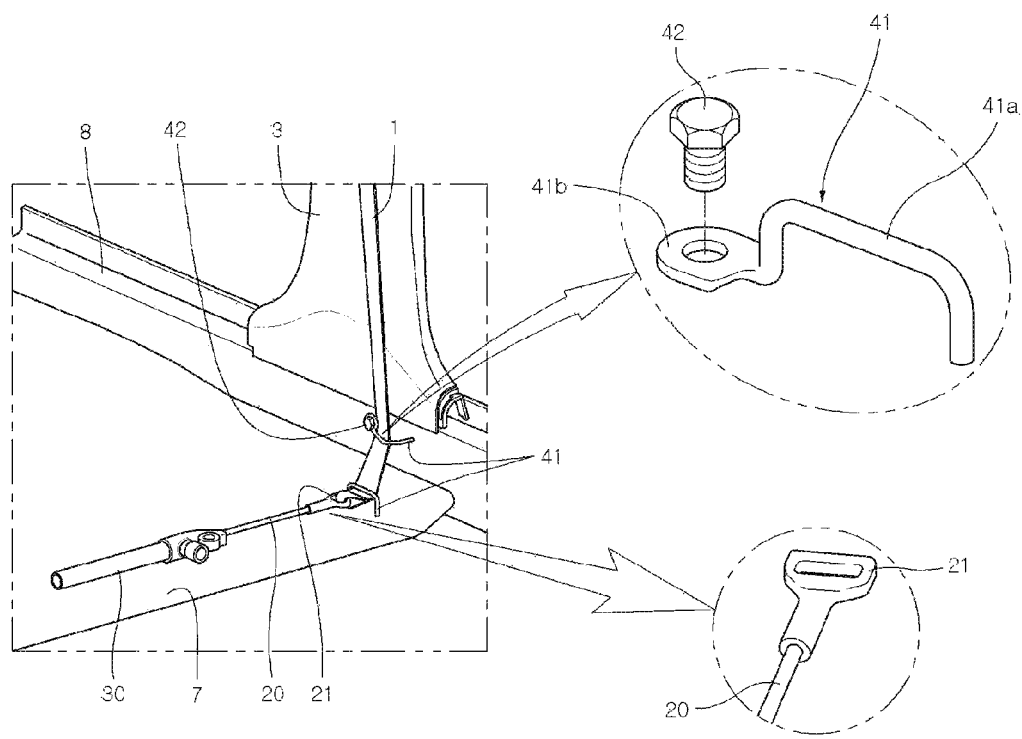
FIGS. 3 to 6 are views illustrating an apparatus for mounting a seat belt to a vehicle body according to an exemplary embodiment of the present invention, and showing different kinds of belt restraining units.

As shown in FIG. 3, the mounting apparatus according to an exemplary embodiment of the present invention includes a wire 20, a wire installing unit 30, and a belt restraining unit. The wire 20 integrally has on a first end thereof a belt insert ring 21, so that an end of the seat belt 1 is inserted into the belt insert ring 21. The wire installing unit 30 is coupled to a second end of the wire 20 and is secured to the vehicle body. The belt restraining unit is mounted to the vehicle body in such a way as to cover the seat belt 1, and restrains the movement of the seat belt 1 inserted into the belt insert ring 21.

Here, the wire installing unit 30 is secured to a floor panel 7 located in the vehicle such that opposite ends of the wire installing unit 30 face the left and right sides of the vehicle body.

Meanwhile, the belt restraining unit may be formed in various shapes. For example, as shown in FIG. 3, the belt restraining unit includes a pair of rotary hooks 41, each of which has a 'U'-shaped hook part 41a that covers the seat belt 1 and is rotatably coupled at a first end thereof to the vehicle body.

Each rotary hook 41 is fastened to the vehicle body using a fastening member 42 such as a bolt. Preferably, a flange part 41b of the rotary hook 41 to which the fastening member 42 is fastened is fabricated in the form of a flat washer.

Preferably, one rotary hook 41 which is adjacent to the belt insert ring 21 is rotatably installed to the floor panel 7 provided in the interior of the vehicle, while the other rotary hook 41 is rotatably installed to a side member 8.

Further, in order to improve the appearance of the interior of the vehicle, the rotary hook 41 which is installed to the floor panel 7 provided in the interior of the vehicle is covered with a carpet.

The carpet is the member which covers the floor panel 7 so as to provide an improved appearance to the interior of the vehicle.

Since the apparatus for mounting the seat belt to the vehicle body according to an exemplary embodiment of the present invention is constructed so that only the rotary hook 41 coupled to the side member 8 is exposed to the interior of the vehicle, the apparatus of this invention can considerably improve the appearance of the interior, in comparison with the conventional structure.

Further, even if the seat belt 1 is shaken by inertia of a vehicle which is being driven, no component collides with the vehicle body, so that noise is not generated and thus the sound level of the interior can be remarkably improved. The apparatus enables the feet of a passenger sitting in a rear seat to be comfortably placed, so that the passenger sitting in the rear seat can feel very comfortable. Especially there is no interference between the apparatus and an airbag tube when a side airbag is deployed, so that the airbag tube is guided to be correctly deployed.

The apparatus for mounting the seat belt to the vehicle body according to an exemplary embodiment of the present invention includes the belt insert ring 21 and the two simple rotary hooks 41, thus achieving a considerable reduction in volume in comparison with the conventional construction using the mini tongue 11 and the cover member 14, and realizing a weight reduction and lower manufacturing cost.

Figure 4:
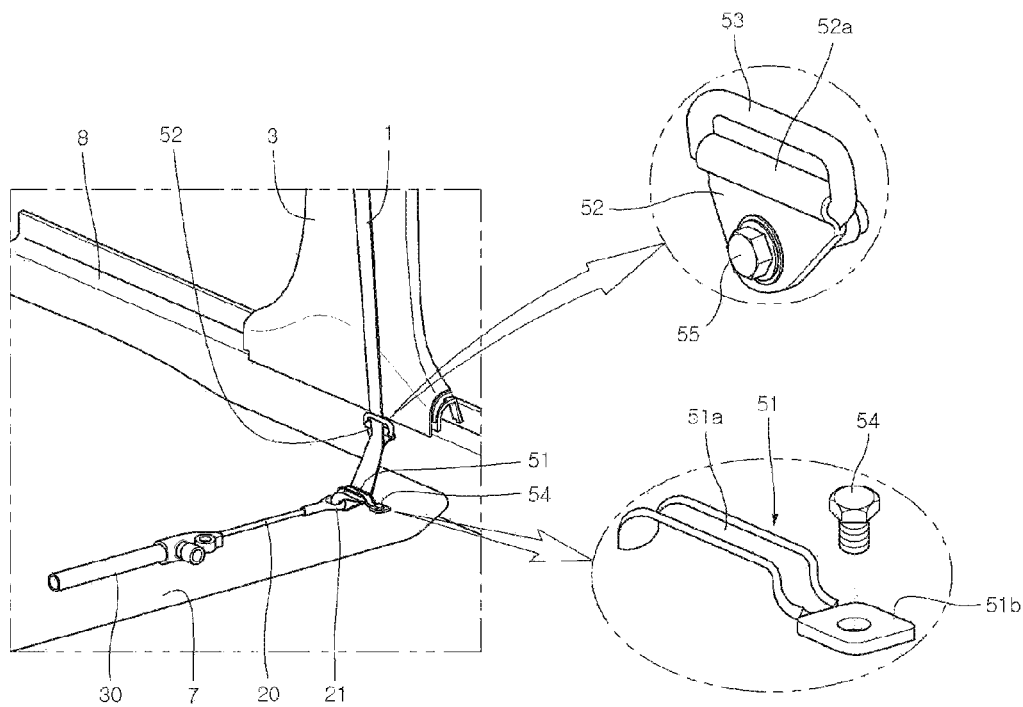

FIG. 4 shows a belt restraining unit according to another embodiment of the present invention. The belt restraining unit includes a rotary hook 51, a hook mounting bracket 52, and a circular hook 53. The rotary hook 51 has a 'U'-shaped hook part 51a that covers the seat belt 1 and is rotatably coupled at a first end thereof to the vehicle body. The hook mounting bracket 52 is provided with one hook insert part 52a and secured to the vehicle body. The circular hook 53 is inserted into the hook insert part 52a to be rotatable relative to the hook mounting bracket 52, so that the seat belt 1 passes through a space between the circular hook 53 and the hook mounting bracket 52.

The rotary hook 51 is fastened to the vehicle body using a fastening member 54 such as a bolt. Preferably, a flange part 51*b* of the rotary hook 51 to which the fastening member 52 is fastened is fabricated in the form of a flat washer.

Further, the hook mounting bracket 52 is also fastened to the vehicle body by a fastening member 55 such as a bolt.

Here, the rotary hook 51 is located at a position adjacent to the belt insert ring 21 and rotatably installed to the floor panel 7 which is provided in the interior of the vehicle. The hook mounting bracket 52 is fastened to the side member 8 via the fastening member 55.

Further, in order to improve the appearance of the interior of the vehicle, the rotary hook 51 which is installed to the floor panel 7 provided in the interior of the vehicle is covered with a carpet.

Figure 5:
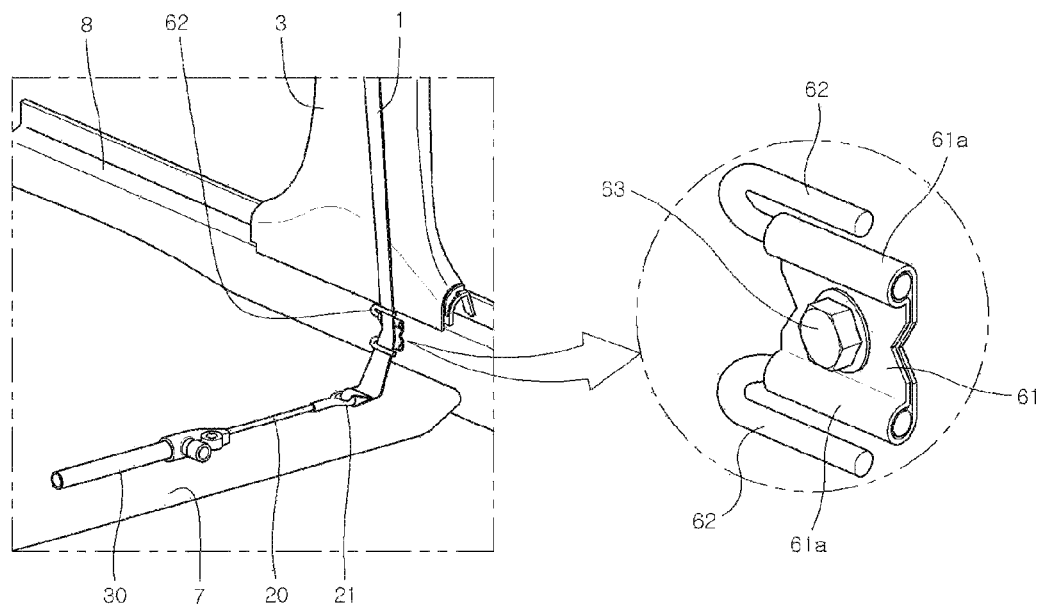

FIG. 5 shows a belt restraining unit according to a further embodiment of the present invention. The belt restraining unit includes a hook mounting bracket 61 and two U-shaped rotary hooks 62. The hook mounting bracket 61 has on opposite ends thereof two hook insert parts 61*a*, and is secured to a vehicle body. A first end of each U-shaped rotary hook 62 is rotatably inserted into the corresponding hook insert part 61*a*. The seat belt 1 is inserted into a space between the rotary hooks 62 and the hook insert parts 61*a*.

Here, the hook mounting bracket 61 is fastened to the side member 8 via a fastening member 63 such as a bolt.

Figure 6:
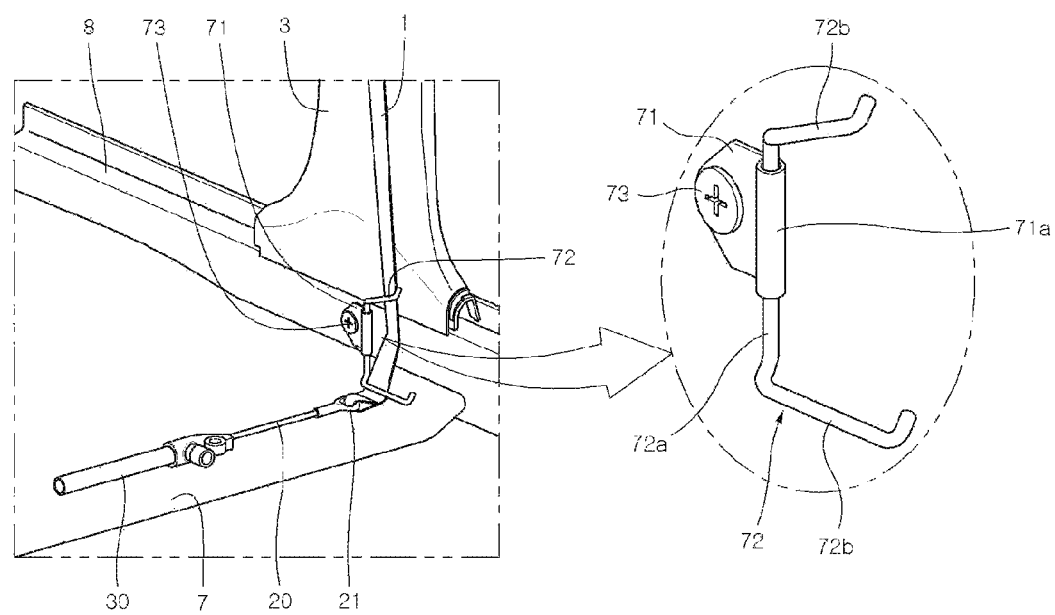

Further, FIG. 6 shows a belt restraining unit according to another embodiment of the present invention. The belt restraining unit includes a hook mounting bracket 71 and a double hook 72. The hook mounting bracket 71 is provided with one hook insert part 71*a* and secured to the vehicle body. The double hook 72 is provided with a rod part 72*a* which rotatably passes through the hook insert part 71*a*, and a pair of hook parts 72*b* which are bent, respectively, on opposite ends of the rod part 72*a* in a U shape.

Here, the hook mounting bracket 71 is fastened to the side member 8 via a fastening member 73 such as a bolt.

As described above, the present invention provides an apparatus for mounting a seat belt to a vehicle body, which is constructed so that only a seat belt 1 and a belt restraining unit are exposed to the interior of a vehicle, thus remarkably improving the appearance of the interior, and in which no component collides with the vehicle body even if the seat belt 1 is shaken by the inertia of the driving vehicle, thus considerably improving the sound level of the interior, and which allows the feet of a passenger sitting in a rear seat to be comfortably placed, thus remarkably improving the riding comfort for the passenger sitting in the rear seat, and in which there is no interference between the apparatus and an airbag tube especially when a side airbag is deployed, so that the airbag tube can be guided to be correctly deployed.

Further, the present invention provides an apparatus for mounting a seat belt to a vehicle body, which is constructed so that the seat belt 1 is restrained using a belt insert ring 21 and a belt restraining unit, thus realizing reductions in volume, weight and cost.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for mounting a seat belt to a vehicle body, comprising:
    a wire integrally having on a first end thereof a belt insert ring, an end of the seat belt being inserted into the belt insert ring;
    a wire installing unit coupled to a second end of the wire and secured to the vehicle body; and
    a belt restraining unit coupled to the vehicle body while slidably receiving the seat belt so as to restrain movement of the seat belt which is inserted into the belt insert ring;
    wherein the belt restraining unit comprises a pair of rotary hooks, each of the rotary hooks having a U-shaped hook part that slidably receives the seat belt, and being rotatably coupled at a first end thereof to the vehicle body.

2. The apparatus as set forth in claim 1, wherein the wire installing unit is secured to a floor panel placed in an interior of a vehicle.

3. The apparatus as set forth in claim 2, wherein the wire is aligned along the floor panel.

4. The apparatus as set forth in claim 3, wherein the wire is operable between the wire installing unit and the belt restraining unit.

5. The apparatus as set forth in claim 1, wherein one of the rotary hooks is rotatably provided on a floor panel placed in an interior of a vehicle, and a remaining one of the rotary hooks is rotatably provided on a side member.

6. The apparatus as set forth in claim 5, wherein the rotary hook provided on the floor panel which is placed in the interior of the vehicle is covered with a carpet.

7. An apparatus for mounting a seat belt to a vehicle body, comprising:
    a wire integrally having on a first end thereof a belt insert ring, an end of the seat belt being inserted into the belt insert ring;
    a wire installing unit coupled to a second end of the wire and secured to the vehicle body; and
    a belt restraining unit coupled to the vehicle body while slidably receiving the seat belt so as to restrain movement of the seat belt which is inserted into the belt insert ring;
    wherein the belt restraining unit comprises:
        a rotary hook having a U-shaped hook part that slidably receives the seat belt, and rotatably coupled at a first end thereof to the vehicle body;
        a hook mounting bracket having one hook insert part and secured to the vehicle body; and
        a looped hook inserted into the hook insert part to be rotatable relative to the hook mounting bracket, the seat belt passing through a space between the looped hook and the hook mounting bracket.

8. The apparatus as set forth in claim 7, wherein the rotary hook is rotatably provided on a floor panel placed in an interior of a vehicle, and
    the hook mounting bracket is rotatably provided on a side member.

9. The apparatus as set forth in claim 8, wherein the rotary hook provided on the floor panel which is placed in the interior of the vehicle is covered with a carpet.

10. An apparatus for mounting a seat belt to a vehicle body, comprising:
   a wire integrally having on a first end thereof a belt insert ring, an end of the seat belt being inserted into the belt insert ring;
   a wire installing unit coupled to a second end of the wire and secured to the vehicle body; and
   a belt restraining unit coupled to the vehicle body while slidably receiving the seat belt so as to restrain movement of the seat belt which is inserted into the belt insert ring;
   wherein the belt restraining unit comprises:
      a hook mounting bracket having on opposite ends thereof two hook insert parts, the hook mounting bracket being secured to the vehicle body; and
      two U-shaped rotary hooks, each of the rotary hooks being rotatably inserted at a first end thereof into the corresponding hook insert part, the seat belt passing through space between the rotary hooks and the hook insert parts.

11. The apparatus as set forth in claim 10, wherein the hook mounting bracket is secured to a side member.

12. An apparatus for mounting a seat belt to a vehicle body, comprising:
   a wire integrally having on a first end thereof a belt insert ring, an end of the seat belt being inserted into the belt insert ring;
   a wire installing unit coupled to a second end of the wire and secured to the vehicle body; and
   a belt restraining unit coupled to the vehicle body while slidably receiving the seat belt so as to restrain movement of the seat belt which is inserted into the belt insert ring;
   wherein the belt restraining unit comprises:
      a hook mounting bracket having one hook insert part and secured to the vehicle body; and
      a double hook having a rod part which rotatably passes through the hook insert part, and a pair of hook parts which are bent, respectively, on opposite ends of the rod part in a U shape; and
   wherein the seat belt is slidably received under the hook parts.

13. The apparatus as set forth in claim 12, wherein the hook mounting bracket is secured to a side member.

* * * * *